Loci of constant densities

Loci of constant densities

Loci of constant densities

United States Patent Office 3,427,730
Patented Feb. 18, 1969

3,427,730
FOG SIMULATOR AND METHOD FOR ACCOMPLISHING AIRBORNE SIMULATION OF A FOG
Paul A. Noxon, Tenafly, N.J., assignor to The Bendix Corporation, a corporation of Delaware
Filed Dec. 23, 1966, Ser. No. 604,476
U.S. Cl. 35—12                                34 Claims
Int. Cl. G09b 9/08

ABSTRACT OF THE DISCLOSURE

A method for accomplishing simulation of fog conditions by the selective programming of a variable light gradient effecting the fog simulation in response to various operating criteria.

A fog simulator for use in aircraft having a variable light transmission strip, the transmission of light by the strip varying as a function of altitude and look angle relative to the horizon in that the variable light transmission strip is adjusted in accordance with altitude of the craft so as to provide an illumination pattern corresponding to a simulated fog density at the prevailing craft altitude. Means are provided for viewing the true visual scene through an attenuator and for combining the illumination pattern with the attenuated true world scene so that the observer views the true world scene as if in a fog. Means are also provided for stabilizing the illumination pattern with pitch attitude of the aircraft so that the illumination pattern always appears to the observer to be in the same position relative to the actual horizon.

In an embodiment of the invention for daytime operation, a light source is adjusted to the intensity of ambient light outside the aircraft and is attenuated by the strip to provide the illumination pattern. In an embodiment of the invention for nighttime operation, the true world scene is attenuated by the strip to provide the illumination pattern and the attenuator for the true world scene also is adjusted in accordance with craft altitude. In addition, the true world scene is viewed through a diffusion screen to provide halos around ground lights so as to add realism to the simulated nighttime fog scene.

CROSS REFERENCES TO RELATED APPLICATIONS

The system is related to the concepts found in a Head-Up Display means of a type such as disclosed and claimed in a copending U.S. application Ser. No. 315,188, now abandoned, filed Oct. 10, 1963, by Francis Henry S. Rossire, assigned to The Bendix Corporation and to a copending U.S. application Ser. No. 576,298 filed August 31, 1966, by Paul A. Noxon, also assigned to The Bendix Corporation, assignee of the present invention.

BACKGROUND OF THE INVENTION

Field of the invention

This invention relates to a means and method to simulate atmospheric conditions and more particularly to the simulation of fog, as a visual display, as viewed from an aircraft to facilitate the training and testing of aircraft operators by varying fog density so as to approximate visual effects under true fog conditions.

The subject invention more particularly relates to a means and method to simulate visual fog conditions experienced in flight of an aircraft by combining a separately obtained attenuation of a direct view of the real world and an illumination pattern and includes a continuous fog pattern strip programmed to simulate fog conditions at different altitudes and to maintain a simulated horizon corresponding to the true horizon.

Description of the prior art

A description of the prior art, and the attendant problems to which the present invention is directed are set forth in the aforenoted copending U.S. application Ser. No. 576,298 filed Aug. 31, 1966, by Paul A. Noxon, the inventor of the subject matter of the present invention.

As stated in the last mentioned copending application, in test programs concerned with display systems, visual aids and other devices for the landing of aircraft under conditions of low visibility, as well as the training and proficiency testing of pilots under these conditions, it has been the practice in recent years to employ various means to simulate the presence of fog.

Such devices have generally taken the form of Mylar or graduated ground glass screens, interposed between the pilot's eyes and the visual scene. While usually affixed to the windshield, stabilization of these screens relative to various parameters has been attempted. In either case, the objective has been to limit the pilot's visual sector by restricting it to some angle depressed from the horizontal, and generally to create the impression of looking through a fog.

Such prior art devices have not met with much success for a number of reasons:

First.—Such screens tend to diffuse or defocus any object seen through them. A real fog, however, has only the effect of attenuating the light reflected from an object (in daylight) progressively with distance, coupled with an increasing overlay of illumination from the fog droplets until at cut off the objects cannot be distinguished by reason of low contrast with the background. At all points, however, any object seen at all can be seen in sharp focus. The same is true at night, except that lights tend to produce a local high intensity background illumination or halo. The light itself, however, if seen at all will be seen sharply focused.

Second.—As was shown in the copending application, the gradient of optical effects of a fog, such as illumination overlay, over the angular range from cockpit cut off to the horizon is a strong function of altitude. A fixed gradient, such as provided by a ground glass screen cannot, therefore, approach the visual effect of descending through a fog.

Third.—Vertical motion of the pilot's eyes either because of compliance of the seat and his own body in turbulence, or by involuntary "peeking" can radically alter the visual sector dynamically and thus make the acquisition of valid data difficult.

Fourth.—Any screen interposed near the pilot's point of observation will be perceived by him for exactly what it is—a strictly local object—hence the illusion of an actual fog is never really achieved by such prior art devices.

In the subject matter of the aforenoted U.S. application Ser. No. 576,298, by the inventor of the subject matter of the present invention, there is provided a fog simulator and method for accomplishing airborne simulation of a fog in which there is produced an illumination pattern having the required characteristics of controllable brightness as well as a brightness gradient by combining an illuminated fixed gradient attenuator at the focal plane of an optical system and a separate source of uniform illumination. The gradient of illumination presented to the pilot was varied by differentially controlling the output of the sources of light associated with the focal plane and the uniform field, respectively.

This method required a somewhat complex control apparatus, and was limited in certain respects (e.g., sky brightness was uncontrollably variable, and only linear gradients could be employed).

The system optically is somewhat similar to the concepts found in a Head-Up Display means of a type such as disclosed and claimed in a copending U.S. application Ser. No. 315,188 filed Oct. 10, 1963, by Francis Henry S. Rossire, and assigned to The Bendix Corporation, in which by means of collimation, the effects of pilot motion upon the system are eliminated, since the images will appear at infinity.

SUMMARY

The present invention relates to improvements in the fog simulator and method described and claimed in the aforenoted copending U.S. application Ser. No. 576,298 filed Aug. 31, 1966, by Paul A Noxon, the inventor of the subject matter of the present invention, and assigned to The Bendix Corporation, assignee of the present invention.

The system concept employed in the fog simulator of the present invention is that of presenting through a variable density light diffusion pattern strip a computed, collimated, illumination pattern to the pilot between him and the outside world such as to reduce the contrast ratio, thereby producing the effect through the simulator of viewing the real world under realistic dynamic fog conditions. This airborne fog simulation device will permit training and evaluation of pilot performance under consistent controlled dynamic conditions of flight.

The instant invention contemplates an improved fog simulator to overcome substantially all of the above difficulties.

Another object within the contemplation of the instant invention is to provide a fog simulator including an optical device in which the functions of attenuation and provision of an illumination pattern are separated and individually controlled by means of a variable density light diffusion pattern in the form of a continuous variable light permeable strip having a light gradient corresponding to a given condition disposed laterally to is axis and continuously variable over any required range throughout its length so that the precise light gradient required at any time can be found somewhere within the length of the variable light permeable strip and through which improved arrangement the brightness of the light source is not involved in the light gradient programming, and only need be controlled as the ambient illumination dictates.

While it was quite possible to employ a linear gradient pattern with the continuous variable light permeable strip, such a restriction was not considered necessary as it seemed highly desirable to employ the natural nonlinear gradient, as far as it was known, with a consequent enhancement of realism. To do this, it was necessary to discover what the characteristics of the strip must be so that it may be known how to program it.

Another object of the invention is to provide a fog simulator in which a fog pattern effected by a variable density light diffusion strip may be collimated at a distance, thus creating a vivid illusion of reality to the pilot.

Another object of the invention is to provide a method for accomplishing airborne simulation of fog conditions by selective programming of a variable light diffusion pattern on a continuously variable light permeable strip and selectively positioning the strip to vary the brightness of the fog simulation with altitude of the aircraft above ground terrain.

Another object of the invention is to provide a method of correcting the fog simulation with pitch attitude of the aircraft by angularly positioning a combining mirror at the focal plane of the optical system through half the angle by which the aircraft departs from the horizontal so that the focal plane of the optical system is effectively positioned at a correct angular relation to the visual scene as modified by the prevailing altitude of the aircraft to effect the result sought.

Another object of the invention is to provide a method of selectively programming simulated fog conditions by means of a variable density light diffusion pattern on a continuous strip to simulate day fog conditions, as well as simulated night fog conditions.

Another object of the invention is to provide a fog simulator including a continuous variable density light diffusion pattern means for presenting a computed, collimated, illumination pattern between the pilot and the outside world so as to reduce the contrast ratio and produce the effect on the pilot of viewing the world under realistic dynamic fog conditions.

Another object of the invention is to provide such a fog simulator as will permit the training of pilots and the evaluation of pilot performance under consistent controlled dynamic conditions of flight in an aircraft.

Another object of the invention is to provide a fog simulator in which through means of collimation, the effects of pilot motion upon the system are eliminated.

Another object of the invention is to provide a daytime fog simulator in which fog patterns are developed by novel means including a continuous variable density light diffusion strip, together with a variable light source effective to maintain known ratios of image brightness to ambient conditions as well as having programmed functions provided by the strip variable with altitude and the fog densities to be simulated as well as means to correct the optical device at the focal plane for changes in pitch of the aircraft.

Another object of the invention is to provide in such a fog simulator an electromechanical computer to control the variable density light diffusion strip in accordance with predetermined programmed fog conditions.

Another object of the invention is to provide in the fog simulator novel means for selectively programming the variable density light diffusion strip and thereby the fog simulation with the altitude of the aircraft above ground terrain.

Another object of the invention is to provide in a fog simulator novel means for modulating fog simulation with the pitch attitude of the aircraft in such a way that the simulated fog is dependent upon the angle of flight of the aircraft relative to the horizon at the prevailing altitude of the aircraft.

Another object of the invention is to provide in a fog simulator a novel variable light permeable strip means for selectively programming the simulated fog conditions under predetermined homogenous, cloud base, "hook fog" and other fog conditions.

Another object of the invention is to provide in a fog simulator novel variable light permeable strip means to simulate night fog conditions.

Another object of the invention is to provide a daytime fog simulator in which fog images are developed through means of a variable density light diffusion pattern strip so arranged as to maintain known ratios of image brightness to ambient conditions as well as having programmed functions effected by adjusting the relation of the strip to the focal plane with altitude and the fog densities to be simulated so as to effect the desired programmed fog condition to be simulated as well as to angularly position the focal plane in relation to the visual scene with changes in the pitch attitude of the aircraft.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE DRAWINGS

In the several drawings in which corresponding numerals indicate corresponding parts.

plotted for various altitudes on a scale of λ.

Figure 5:
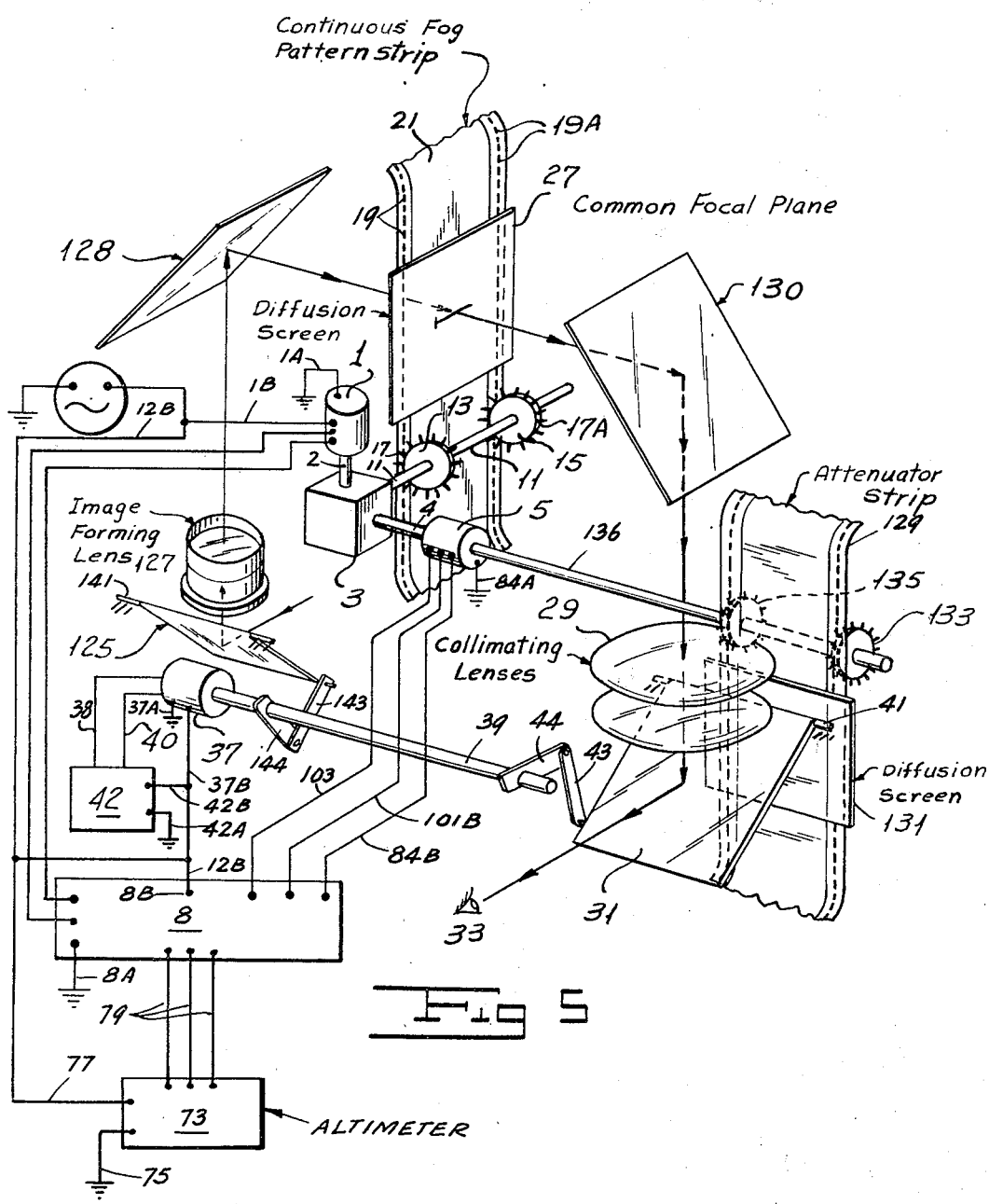
FIGURE 5 is a schematic view of an optical electromechanical fog simulator adapted for nighttime use embodying the present invention and with which a similar electrical control network to that shown by FIGURE 4 may be utilized to control the position of the fog pattern strip, except that the photocells, independent light source and null meter of FIGURE 4 may be operably disconnected by the opening of suitable switch mechanisms so as not to be utilized during the nighttime operation to control the optical electromechanical fog simulator of FIGURE 5.
Figure 6:
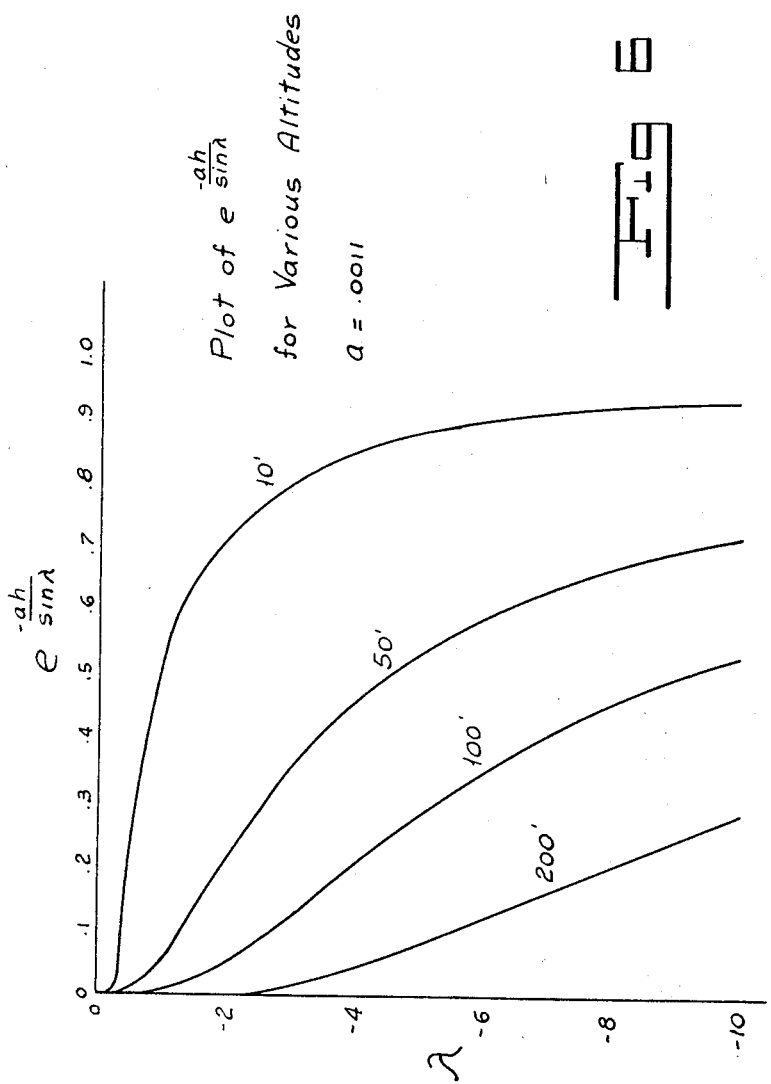
FIGURE 6 is a graphical representation of the attenuation of illumination from the real world represented by $$e^{-\frac{ah}{\sin \lambda}}$$
Figure 7:
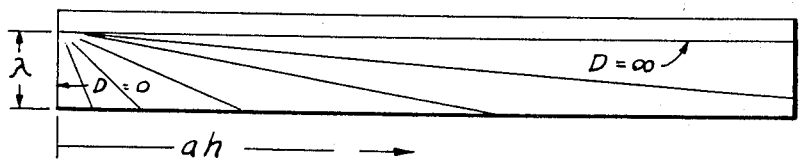

FIGURE 7 is a graphical representation of the loci of constant photographic densities of a continuous fog pattern strip wherein D is said density as plotted on the scale of λ against the product $ah$ (where $a$ is fog density and $h$ is defined as the aircraft altitude above terrain) for the embodiment of the invention shown in FIGURE 5 as applied to a fog simulator adapted for nighttime use.

Figure 8:
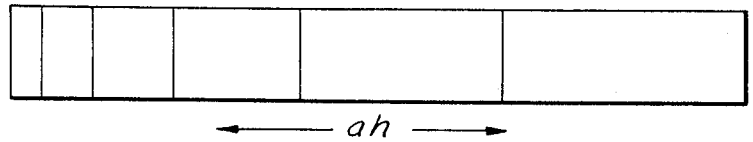

FIGURE 8 is a graphical representation of the loci of constant photographic densities of the attenuator strip of FIGURE 5 wherein D is said density, containing only lateral components, as plotted on a scale of $ah$ (where $a$ is fog density and $h$ is defined as the aircraft altitude above terrain).

DESCRIPTION OF THE INVENTION

Referring now to the drawing of FIGURE 1, there is shown a reversible servomotor 1 which may be of a conventional two phase type, mechanically connected by a shaft 2 to a gearing 3, said gearing also being connected mechanically by a shaft 4 to a follow up signal generator 5 and through a shaft 6 to a position a variable light transmission strip to simulate variable fog pattern conditions, as hereinafter explained. Both the motor 1 and the follow up signal generator 5 receive electrical control signals from a control network indicated generally by the numeral 8, and shown in detail by FIGURE 4.

Figure 4:
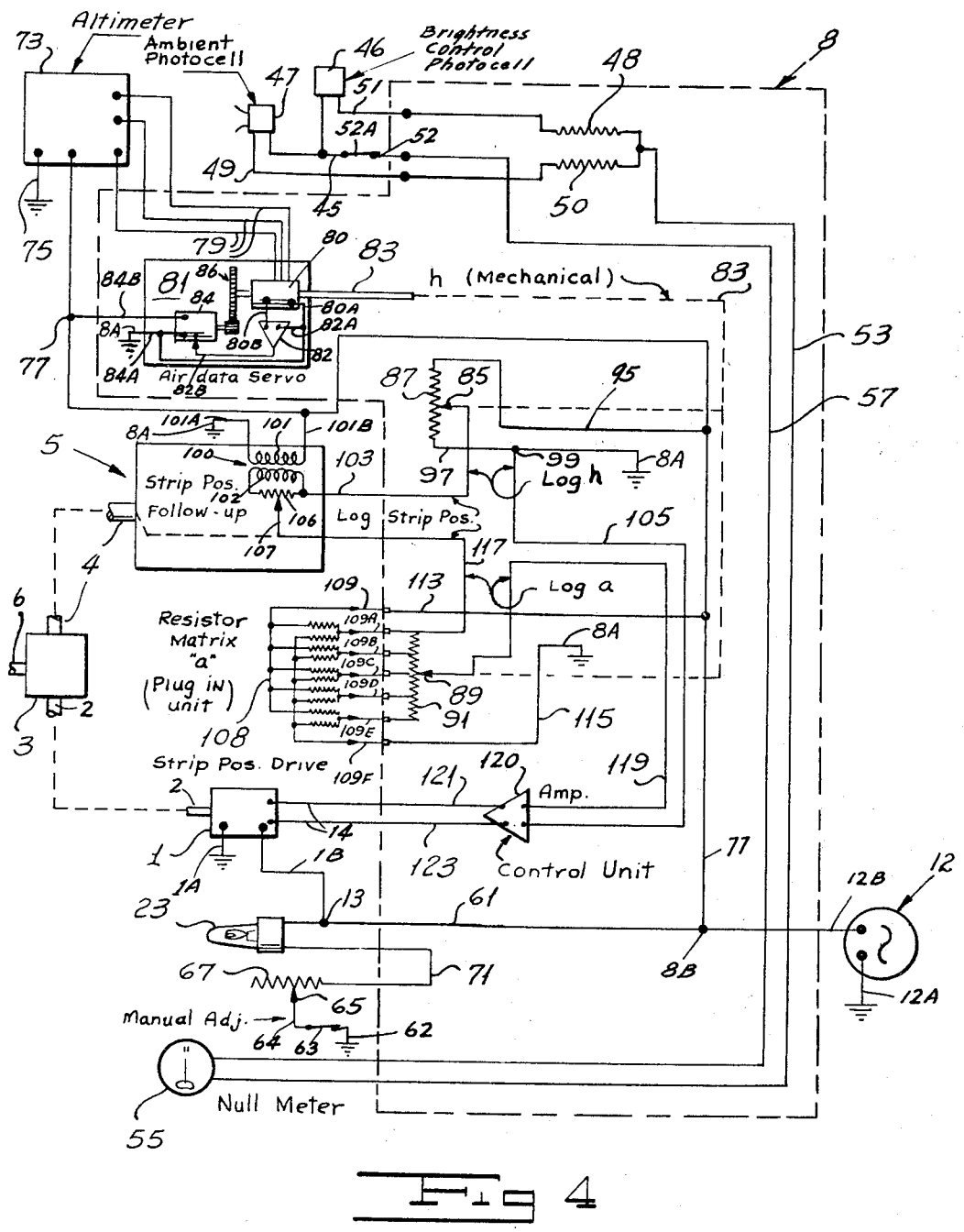
FIGURE 4 is a schematic representation of an electrical network that may be utilized to control the position of the aforesaid continuous fog pattern strip in the embodiment of the invention shown by FIGURE 1 in accordance with the prevailing altitude of an aircraft and including optical electromechanical means for providing an illumination pattern by properly balancing the ambient light with the intensity of the light source.

The motor 1, which may be of a conventional two phase type, includes a fixed phase winding connected through a grounded conductor 1A and a conductor 1B to a source of alternating current 12 having a grounded output conductor 12A and an output conductor 12B connected to the conductor 1B at a junction 13. The motor 1 may also have a control winding connected through conductors 14 to output conductors leading from the control network 8, as shown by FIGURE 4.

Figure 1:
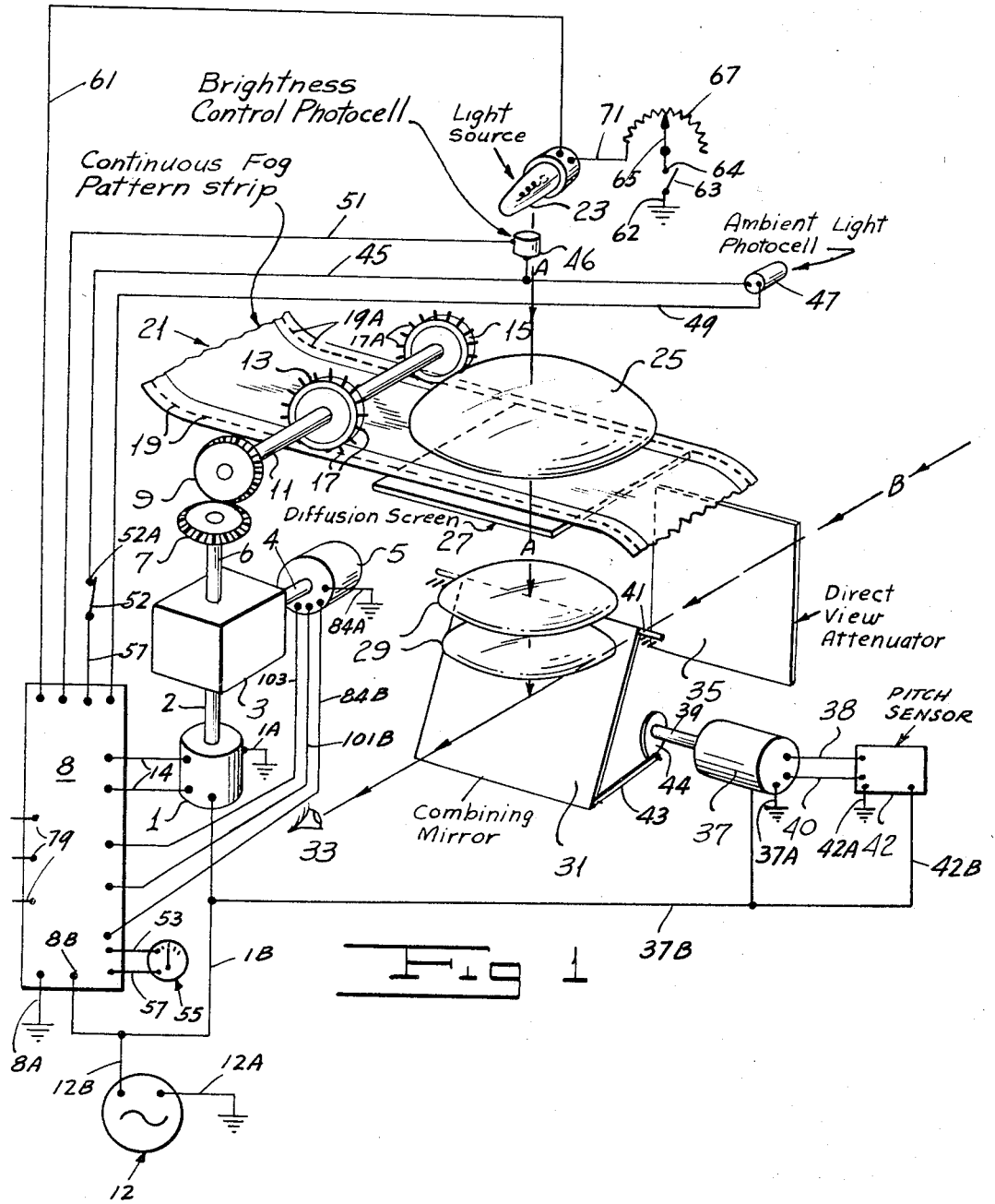
FIGURE 1 is a schematic view of a basic optical electromechanical form of a fog simulator adapted for daytime use and embodying the present invention.
Figure 2:
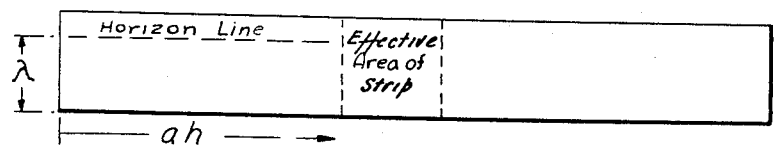
FIGURE 2 is a graphical representation of the continuous fog pattern strip wherein the width of said strip to the horizon line is indicated as λ which corresponds to the angle between the horizon and an observer's line of sight and the length is the product $ah$ (where $a$ is fog density and $h$ is defined as the aircraft altitude above terrain).

The servomotor 1 through the gearing 3 positions the follow up signal generator 5 through the shaft 4, as well as positions through the shaft 6, as shown by FIGURE 1, a gear 7 affixed to the shaft 6 and which gear 7 is in turn arranged in meshing engagement with a gear 9. The gear 9 is connected by a shaft 11 to sprockets 13 and 15 having teeth 17 and 17A projecting radially therefrom, for engaging perforations 19 and 19A in a continuous variable light transmission strip 21 to position the strip 21 in accordance with the controlling signal supplied by the network 8 to the servomotor 1. The characteristics of the variable light transmission strip 21 and the resulting simulated fog pattern effected thereby, will be hereinafter more fully explained.

Further as shown by FIGURE 1, there is provided a light source 23 which may be of an electrical lamp type placed in spatial relation to said continuous variable light transmission strip 21. A condenser lens 25 is placed parallel to the plane of the strip 21 and between the light source 23 and said strip 21 so as to receive rays of lights A from the light source 23 and transmit them in an essentially parallel configuration. The light rays A transmitted by the condenser lens 25 now impinge upon the aforesaid continuous variable light transmission strip 21 and pass through said strip 21 as attenuated thereby so as to impinge upon a diffusion screen 27. These diffused light rays are now directed to a system of collimating lenses 29 and are thereupon transmitted in parallel fashion to a partial reflecting or combining mirror 31 which directs said light rays to the eye of an observer 33 in an aircraft carrying the visual fog simulator.

Further, during flight of the aircraft light rays B transmitted from a visual scene in the real world and viewable by the observer in the aircraft impinge upon a direct view attenuator 35 and these attenuator rays are now transmitted to the aforesaid combining mirror 31. The combining mirror 31 transmits to the eye of the observer 33 a combination of the aforesaid two sets of light rays, i.e., the light rays B from the visual scene in the real world applied through the direct view attenuator 35 and the light rays A. The light rays A originating at the light source 23, are attenuated by the variable light transmission strip 21 and applied through the diffusion screen 27 and collimating lens system 29 to the partially reflecting mirror 31 where the rays A and B are combined and directed to the eye of the observer 33.

There is further provided a reversible servomotor 37 which may be of a conventional two phase type having a fixed phase winding connected through a grounded conductor 37A and a conductor 37B leading to the source of alternating current 12 through conductors 1B and 12B. The servomotor 37 has a control winding connected through conductors 38 and 40 to an alternating current control signal supplied by an aircraft pitch sensor 42 of conventional type energized from the source of alternating current 12 through a grounded conductor 42A and a conductor 42B leading to the source 12 through conductors 37B, 1B and 12B. The servomotor 37 as controlled by the alternating current signal supplied by the aircraft pitch sensor angularly positions a shaft 39 so as to in turn position the combining mirror 31 in response to changes in the pitch of the aircraft in such a manner that the horizon portion of the continuous fog pattern effected by the variable light transmission strip 21 is always aligned with the true horizon as seen through the direct view attenuator 35 regardless of the prevailing pitch of the aircraft during flight thereof.

In effecting the latter operation, it will be seen from FIGURE 1 that the combining mirror 31 is pivotally mounted at its upper end on a rod 41 which is fixedly mounted at opposite ends. A lower end of the combining mirror 31 is connected by a pin to an end of a link 43 which is in turn connected at an opposite end by a pin to an arm 44 mounted at an end of the shaft 39 angularly positioned by the servomotor 37. Thus the servomotor 37 in response to the controlling signals supplied by the pitch sensor 42 so angularly positions the combining mirror 31 that the horizon portion of the simulated visual fog pattern effected by the light rays A is always aligned with the true horizon effected by the light rays B as seen through the direct view attenuator 35 regardless of the prevailing pitch attitude of the aircraft.

Further, there is provided in the form of the invention of FIGURE 1 a brightness control photocell 46 and an ambient light responsive photocell 47. The ambient light responsive photocell 47 is so positioned as to be responsive to the intensity of the prevailing ambient light under true world light conditions, and provides through output conductors 45 and 49 a direct current control signal to the electrical network 8 of FIGURE 1, as shown in greater detail by FIGURE 4. A brightness control photocell 46 is further provided in cooperative relation to the light source 23 so as to be responsive to the intensity of the light rays provided by light source 23. The photocell 46 also provides a direct current control signal through conductors 45 and 51 to the electrical network 8 of FIGURE 1, as shown in detail by FIGURE 4.

Referring now to the schematic drawing of FIGURE 4, the photocell 46 has an output terminal connected through the conductor 51 to one end of a resistor 48 while the other end of said resistor 48 is connected to a conductor 53. The other output terminal of photocell 46 is connected through the conductor 45 to a switch arm 53A controlling a switch contact 52 connected by a conductor 57 to one terminal of a null meter 55 responsive to voltage applied across the conductor 57 and the conductor 53 leading to the other terminal of the null meter 55.

One output terminal of ambient light responsive photocell 47 is connected through a conductor 49 to an end of a resistor 50 connected at an opposite end to the conductor 53 leading to the other terminal of the null meter 55.

Resistors 48 and 50 in combination with the aforesaid photocells 47 and 46 form a bridge network with an output junction of the resistors 48 and 50 being connected through the conductor 53 to an input terminal of the null meter 55 with another conductor 57 leading from an output junction of the photocells 46 and 47 to the other input terminal of the null meter 55. The direct current voltages applied by the photocells 46 and 47 are connected through the bridge network in opposing relation so that upon the voltages being on a balanced relation the null meter 55 indicates a null condition, while upon the signal voltages of one or the other of the photocells 46 or 47 exceeding the other photocell the null meter 55 is effective to indicate whether or not the light source 23 exceeds the ambient light or vice versa.

The source of alternating current 12 is connected through the grounded conductor 12A to a common grounded input terminal 8A to the network 8, as shown by FIGURE 1, while an opposite output terminal of the current source 12 is connected through the conductor 12B to another input terminal 8B of the network 8 and, as shown by FIGURE 4, through the conductor 61 leading from the terminal 8B to a terminal of the light source lamp 23 having an opposite terminal connected through a conductor 71 to ground. Thus a conductor 62 leads from the ground to a switch arm 63 arranged to selectively close a conductor 64 connected to a slide 65 cooperatively arranged in relation to a resistor 67 connected by the conductor 71 to the lamp 23.

By referring to FIGURES 1 and 4, it will be seen wherein by varying the illumination of light source 23 by the adjustment of the slide 65 of resistor 67 there may be effected a balancing of the bridge network composed of resistors 48 and 50 and photocells 46 and 47 as the direct current voltage applied by photocell 46 to balance the output of photocell 47 is a function of the intensity of illumination of the light source 23.

Thus an adjustment of said slide 65 in a sense indicated by the null meter 55 will cause the balancing of the aforesaid bridge network and in turn cause the null meter 55 to be adjusted in response thereto to a null or zero indicator position.

An altimeter 73 which may be of a conventional type including a synchro transmitter with a rotor winding connected through a grounded conductor 75 and a conductor 77 to the source of alternating current 12. The synchro of the altimeter 73 may also include a three phase stator winding inductively coupled to the rotor winding so as to effect an alternating current output signal upon an adjustment of the position of the rotor winding of the synchro transmitter in response to the prevailing altitude of the aircraft as sensed by an atmospheric pressure sensing device operative in a manner well known in the art. Such alternating current output signals are applied from the altimeter 73 through the conductors 79 to an input of an air data servo mechanism 81.

The air data servo mechanism 81 is also of a conventional type including a synchro receiver 80 having three phase stator windings energizing by the alternating current signal supplied by the conductors 79 and a rotor winding inductively coupled to the three phase stator windings and a grounded output conductor 80A and an output conductor 80B connected to an input terminal of a servo amplifier 82 having a grounded input-output conductor 82A and an output conductor 82B leading to a control winding of a reversible servomotor 84 which may be of a conventional two phase type having an opposite end of the control winding and a fixed phase winding connected to a conductor 84A leading to the grounded terminal 8A of the network 8. The opposite end of the fixed phase winding may be connected through a conductor 84B to the conductor 77 leading to the terminal 8B and thereby through conductor 12B to the source of alternating current 12.

The servomotor 84 adjustably positions through a suitable gearing 86 the rotor winding of the synchro receiver 80 in a sense to null at the output conductors 80A and 80B an error signal applied thereto in conventional manner and in turn with the angular adjustment thereof an angular position of an output shaft 83 which is suitably coupled to a slide 85 of a nonlinear potentiometer 87. The shaft 83 is also mechanically coupled by suitable means to a slide 89 of a potentiometer 91, as hereinafter explained.

The alternating current power supply 12 is connected at one terminal through the conductor 12B, terminal 8B and the conductor 77 to a conductor 95 which is in turn connected to one end of the aforesaid nonlinear potentiometer 87, while the other end of said nonlinear potentiometer is connected through a conductor 97 to the grounded terminal 8A of the network 8 and thereby to the grounded conductor 12A leading to the opposite terminal of the alternating current supply 12.

There is provided in the follow up signal generator 5, as shown by FIGURE 4, a transformer 100 having a primary winding 101 and a secondary winding 102 inductively coupled thereto. The slide 85 of potentiometer 87 is electrically connected through a conductor 103 to one terminal of the secondary winding 102 of the transformer 100. A variable resistance 106 of the potentiometer is connected across the opposite ends of the secondary winding 102 while a slide 107 is arranged in cooperative relation with the resistance 106 to control an alternating current follow up output signal applied to the slide 107. The primary winding 101 of the transformer 100 is connected through a conductor 101A to the grounded terminal 8A of the network 8 and through a conductor 101B leading to conductor 77 and thereby across the source of alternating current 12.

Due to the configuration of the potentiometer 87, the electrical signal appearing between conductor 103 and the grounded conductor 97 is a logarithmic function of the altitude $h$.

A resistor matrix 108 of a conventional plug in type is electrically connected to the potentiometer 91 discussed above at junctions 109–109F. This resistor matrix 108 is of a configuration such that it will in part determine the output electrical signal of potentiometer 91 and will thus aid in the simulation of the desired visual fog pattern. A number of such resistor matrix units are available so that the same may be interchangeable so that various fog patterns may be selectively simulated.

The alternating current power supply 12 is connected at one terminal through the conductors 12B and 77 and a conductor 113 leading from conductor 77 to one end of the aforesaid junction 109 of the resistor matrix 108, while the other end of said matrix is connected through the junction 109F and a conductor 115 to the grounded terminal 8A and thereby to the grounded terminal 12A of the alternating current source 12.

The resistor matrix 108 is connected to one end of potentiometer 91 at the junction 109A which is connected through a conductor 117 to slide 107 of potentiometer 106 of the follow up signal generator 5, while the resistor matrix 108 is connected to the other end of potentiometer 91 at the junction 109E.

An amplifier 120 of a conventional type has an input terminal connected to ground through a conductor 105 leading to the junction 99 on the grounded conductor 97 and an opposite input terminal connected through a conductor 119 to the slide 89 of the potentiometer 91.

Due to the configuration of the potentiometer 91 in combination with the resistor matrix 108, the electrical signal appearing between the slide 89 and the junction 99, and thus the electrical signal appearing between conductors 117 atnd 119 is a logarithmic function of the fog density $a$.

Now summing the electrical signals in a closed loop according to Kirchoff's Voltage Law, the electrical signal from the grounded conductor 97 to the slide 85 yields, as previously stated, a logarithmic function of the altitude $h$. The electrical signal between conductors 117 and 119 yields an electrical signal which is a logarithmic function of the fog density $a$ and the electrical signal between conductors 97 and 117 is equal to the log of $a$ plus the log of $h$ due to the positioning of the slide 107 of the follow up signal generator 5 upon the strip 21 being properly positioned.

Assuming the proper algebraic signs, the sum of these voltages in the latter case is zero, and thus the electrical signal from the conductor 119 to ground is equal to zero. If the electrical signal between conductors 103 and 117 is not equal to the log of $a$ plus the log of $h$ due to improper positioning of strip 21, the value of the electrical signal between conductor 119 which is connected to the slide 89 of potentiometer 91, and ground will not be equal to zero, but rather it will be equal to the difference between the value of the signal between conductors 103 and 117 and the sum of log $a$ plus log $h$, again according to Kirchoff's Voltage Law. The value of the electrical signal between conductor 119 and ground is thus a function of the error in the strip position. For this reason conductor 119 is an input to the aforesaid amplifier 120 which has, as above stated, an opposite input terminal connected to ground through the conductors 105 and 97.

When an error exists in the position of the strip 21, an electrical signal proportional to said error carried by conductor 119 is an input to the amplifier, which amplifies said error signal, said amplifier being in turn connected through conductors 14 to the control winding of the reversible servomotor 1 heretofore discussed with regard to FIGURE 1.

OPERATION OF FOG SIMULATOR
OF FIGURES 1 THROUGH 4

In the operation of the instant device in its daytime embodiment, as shown in FIGURE 1, it is desired to combine an attenuated direct view or visual scene of the true world with an illumination pattern so that an observer, shown at 33 of FIGURE 1, will view the true world with the illumination pattern, it therefore appearing to the observer that he is operating within a fog system.

The instant invention makes use of a continuous fog pattern strip 21, the strip being programmed with a photographic density in a linear pattern longitudinally and in a linear pattern laterally resulting in a nonlinear gradient of the photographic density along said fog pattern strip. Thus, as the aforesaid strip 21 travels in the field of the light source 23 and diffusion screen 27, to be discussed hereinafter, varying amounts of light will be passed through said strip, providing different illumination patterns.

It has been found that the equation for the illumination pattern is $$I = I_o \left(1 - e^{-\frac{ah}{\sin \lambda}}\right)$$

where $I$ is the illumination pattern, $I_o$ is the intensity of a light source, to be discussed hereinafter, $a$ is the fog density, $h$ is aircraft altitude and $\lambda$ is the angle between the horizon and the observer's line of sight. It is thus seen that the expression $$\left(1 - e^{-\frac{ah}{\sin \lambda}}\right)$$

is the light transmission ratio of any particular point on the continuous fog pattern strip 21.

Figure 3:
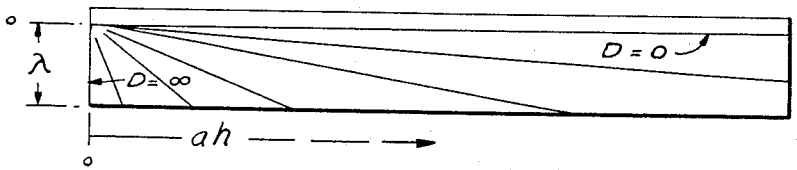
FIGURE 3 is a graphical representation of the loci of constant photographic densities of the continuous fog pattern strip utilized in the embodiment of the invention shown in FIGURE 1 wherein D is said density as plotted on a scale of λ against the product $ah$ (where $a$ is fog density and $h$ is defined as the aircraft altitude above terrain) and the density gradient has both longitudinal and lateral components.

The aforesaid photographic density is equal to $\log_{10}$ divided by the aforesaid transmission ratio or $$D = \log_{10}\left(1 - e^{-\frac{ah}{\sin \lambda}}\right)$$

which is a system of straight lines radiating from the origin $ah$ equal to zero and $\lambda$ equal to zero as shown in FIGURE 3 where D is equal to the aforesaid photographic density.

Light rays B from the real world impinge upon the direct view attenuator 35, said attenuator 35 having a constant photographic density, so that the light rays B passed through said direct view attenuator 35 are transmitted to a combining mirror 31 and from said combining mirror to an observer 33.

A light source 23 transmits rays A to a condenser lens 25, the condenser lens passing the rays A from the aforsaid light source 23 in an essentially parallel and evenly distributed fashion. These light rays A now impinge upon the continuous fog pattern strip 21 and pass through said strip 21, the intensity of the light passing through said strip 21 being dependent upon the photographic density of the portion of the strip 21 underlying said condenser 25, this in turn being dependent upon the position of the strip 21 which is controlled by the altimeter 73 in response to the aircraft altitude as will be explained.

The light rays passing through said fog pattern strip 21 now impinge upon a diffusion screen 27, the diffusion screen evenly distributing the light rays transmitted to it over the entire surface of the diffusion screen 27. This evenly distributed illumination is now provided to a system of collimating lenses 29 which transmits the aforesaid evenly distributed illumination in the form of parallel light rays, these parallel rays being intercepted by the aforesaid combining mirror 31 which reflects these rays in combination with the attenuated light rays from the real world to the observer 33 giving the impression of viewing the real world through a fog.

It is necessary to balance the intensity of the illumination of the light source 23 with the ambient light provided by the true world due to the fact that the intensity of the illumination pattern required for realistic simulation of a fog is dependent upon the relation between the illumination pattern A provided by light source 23 and the intensity of the attenuated light B transmitted from the true world.

For this reason ambient light protocell 47 may be located within the cockpit of the aircraft so as to be responsive to the light intensity of the true world. Brightness control photocell 46 is placed in spatial relation to the light source 23 and measures the intensity of the light transmitted by said light source 23. Thus, the illumination pattern is a function of the intensity of relight source 23 and the photographic density of the particular point on the continuous fog pattern strip 21 attenuating the illumination from the aforesaid light source.

The proper illumination pattern is thus provided by adjusting the resistive potentiometer 67 and thus altering the intensity of light source 23 until a null is indicated by the meter 55.

The present invention receives altitude information from an altimeter network 73 of a conventional type and which as shown in FIGURE 4 applies an alternating current signal indicative of the prevailing altitude of the aircraft through conductors 79 as an input to an air data servo mechanism 81, said servo mechanism 81 indirectly transmitting the altitude information to the strip drive servomotor 1 and gearing 3 which, as shown by FIGURE 1, will position the continuous variable light transmission strip 21, the photographic densities of which are programmed with respect to altitude. Thus, for different altitudes a different brightness gradient is seen by the observer, said gradient being a function of λ, the angle of look of said observer from the horizon, assuming of course, that the fog density $a$ remains constant.

The instant device also has a pitch attitude compensation circuit wherein pitch information is received from the pitch sensor 42 of a conventional type transmitting information to a reversible servomotor 37 which is suitably linked by mechanical means to the aforesaid combining mirror 31, the combining mirror 31, as before stated, combining an attenuated view of the true world with the illumination pattern above discussed. The combining mirror 31 is rotated through an angle equal to one half the angular pitch of the aircraft from the horizon. The purpose of such angular orientation is best understood from a further discussion of the properties of the continuous variable light transmission or fog pattern strip 21. As shown in FIGURE 3, λ equal to zero is an artificial horizon which is programmed onto the aforesaid strip 21. That is, above the λ equal to zero line the photographic density D of said strip 21 is zero.

When the aircraft departs from horizontal flight, the true world as seen through the direct view attenuator 35 and the combining mirror 31 by the observer 33 shows a horizon properly offset due to the pitch attitude of the aircraft. The illumination pattern as provided by the light source 23 and attendant circuitry will simulate a horizon in a constant position without regard to aircraft pitch due to the artificial horizon imposed upon the continuous fog pattern strip 21, as previously discussed at the λ equal to zero level. So that the artificial horizon created by the aforesaid strip 21 with its attendant illumination pattern may coincide with the true horizon as seen through direct view attenuator 35, the combining mirror 31 will, as above explained, be rotated through an angle equal to one half the aircraft pitch angle so that the two horizons may be coincident.

The angular orientation of the combining mirror 31 is set to one half the aircraft pitch angle rather than being set equal to the angular pitch of the aircraft due to summation of the incident and reflected light rays before they reach the eye of the observer. Thus, rotating the mirror 31 one half the aircraft pitch angle will cause the true horizon as seen through the direct view attenuator 35 and the horizon of the fog pattern effected by the strip 21 to appear to be coincident to the observer.

Referring now to the drawing of FIGURE 4, the brightness control photocell 46 is energized by illumination impinging upon its surface and will transmit a D.C. electrical signal between its two output conductors 51 and 45 dependent upon the intensity of the illumination impinging upon the surface of the aforesaid photocell.

Ambient light photocell 47 transmits a D.C. electrical signal between its output conductors 49 and 45 dependent upon the intensity of illumination impinging upon its surface. The output voltages from the aforsaid two photocells are transmitted to a resistor circuit composed of resistors 48 and 50 and through said resistors to a junction from which leads the conductor 53 to an input terminal of the null meter 55 while the opposite terminal of the null meter 55 is connected through the conductor 57, switch 52 and conductor 45 to a junction between output leads 45 from the photocells 46 and 47.

The combination of resistors 48 and 50 with photocells 47 and 46 forms a bridge network and the signals appearing at the output of this bridge are transmitted to a null meter 51 through conductors 53 and 57, respectively.

Lamp 23 is energized by a conventional source of A.C. electrical energy 12 through conductors 61 and 62. Conductor 62 is connected to a slide 65 of a resistive potentiometer 67 with one end of said potentiometer being connected to the aforesaid lamp 23 through a conductor 71. Adjustment of the potentiometer varies the electrical energy to the lamp 23 which in turn will vary the intensity of the lamp illumination. This adjustment will be manually accomplished so that a null is indicated on the aforesaid null meter 55.

An altimeter 73 of a conventional type including a transmitter synchro having an energizing winding which is connected through a grounded conductor 75 and a conductor 77 across the source of alternating current 12 and output windings to transmit altitude information through three wire output conductors 79 to an air data servo mechanism 81 of conventional type. The servo mechanism 81 is drivingly connected by a suitable mechanical linkage 83 to slides 85 and 89 of potentiometers 87 and 91, respectively. The potentiometer 91 is connected to a resistor matrix 108, said matrix being of a conventional plug-in unit type which may be so selected as to program various predetermined fog densities.

The aforesaid potentiometers 87 and 91 are constructed in a logarithmic configuration and thus the output signal of potentiometer 87 appearing between the grounded conductor 97 and conductor 103 will be a logarithmic function of altitude while the output electrical signal of potentiometer 91 appearing between conductors 117 and 119 will be a logarithmic function of the fog density $a$ as predetermined by the resistance characteristics of the aforesaid resistor matrix plug-in unit 108.

An electrical signal which is proportional to the log of the position of the strip 21 appears between conductors 117 and 103 at the output of the follow up signal generator 5 due to the mechanical input signal applied to said follow up signal generator by the gearing unit 3. Summing the electrical signals in a closed loop according to Kirchoff's Voltage Law, the electrical signal from the grounded conductor 97 to the slide 85 yields, as previously stated, a logarithmic function of the altitude $h$. The electrical signal appearing between conductors 117 and 119 is a logarithmic function of the fog density $a$ and the electrical signal between conductors 97 and 117 is equal to the log of $a$ plus the log of $h$ due to the positioning of the slide 107 of the follow up signal generator 5 by gearing 3 through the mechanical linkage in the case where the strip 21 is properly positioned. Assuming the proper algebraic signs, the sum of these voltages is zero, and thus the electrical signal from the conductor 119 to ground is equal to zero.

If the electrical signal between conductors 103 and 117 is not equal to the log of $a$ plus the log of $h$ due to improper positioning of strip 21, the value of the electrical signal between conductor 119, which is connected to the slide 89 of potentiometer 91, and ground will not be equal to zero, but rather it will be equal to the difference between the value of the signal between conductors 103 and 117 and the sum of log $a$ plus log $h$, again according to Kirchoff's Voltage Law. The value of the electrical signal between conductor 119 and ground is thus a function of the error in the strip position. For this reason conductor 119 is an input to the aforesaid amplifier 120 which has an opposite input conductor 105 connected to ground through the grounded conductor 97.

When an error exists in the position of the strip 21, an electrical signal proportional to said error carried by conductor 119 is an input to the amplifier 120, which amplifies said error signal, said amplifier 120 being in turn connected through the conductors 14 to the control winding of the servomotor 1 to control the speed and direction of rotation of the motor 1.

FOG SIMULATOR OF FIGURE 5

Referring now to the drawing of FIGURE 5, in which corresponding numerals indicate corresponding parts to those heretofore described with reference to FIGURES 1 and 4, the form of the fog simulator of FIGURE 5 may be utilized for nighttime operation during which a view of the true world is projected onto a mirror 125 and reflected therefrom through an image forming lens 127 to a mirror 128. The image transmitted by the aforesaid lens 127 is now angularly reflected by the mirror 128 and transmitted therefrom to the continuous fog pattern strip 21. The light rays transmitted by the true world, after passing through the aforesaid strip 21, focus upon the diffusion screen 27 located at the focal point of the image forming lens 127 and said rays are then transmitted through the diffusion screen 27 to mirror 130 which angularly reflects said light rays in a direction perpendicular to the plane of the system of collimating lenses 29. The aforesaid reflected light rays now pass through the collimating lenses 29 emerging in a parallel configuration and are thereupon transmitted to the combining mirror 31 which reflects said rays to an observer 33.

An attenuator strip 129 is placed perpendicular to the line of sight of the true would and parallel to the light rays transmitted by the aforesaid collimating lens system 29 to the aforenoted combining mirror 31. The light rays from the true world, after passing through said attenuator strip 129 are intercepted by a diffusion screen 131 which forms a halo of light about each light source in the true world which transmits light rays from the true world through the attenuator strip 129.

The light rays from the true world transmitted by the attenuator strip 129 and diffusion screen 131 are now transmitted to the aforesaid combining mirror 31 and the observer 33 will now see, when viewing the combining mirror 31, a combination of the light rays from the true world after passage through a continuous fog pattern strip 21 and collimating lens system 29 and another view of the true world after attenuation and diffusion by attenuator strip 129 and diffusion screen 131.

The continuous fog pattern strip 21 is driven with respect to altitude by the motor 1, gearing 3, and sprockets 13 and 15 while a feedback network is provided by use of a follow-up signal generator 5 in a method similar to that previously described with regard to FIGURE 1, while attenuator strip 129 is also driven with respect to altitude by sprockets 133 and 135 applied to a shaft 136 operatively connected to the shaft 4 of the signal generator 5 angularly positioned by the servomotor 1 through the gearing 3.

The pitch sensor 42 is connected through conductors 38 and 40 to the servomotor 37 to the mirrors 125 and 31 through the shaft 39. The shaft 39 includes the arm 44 and link 43 for angularly positioning the combining mirror 31, as heretofore described, and in addition there projects from the shaft 39, as shown by FIGURE 5, an arm 144 connected by a pin to an end of a link 143 which is in turn connected at an opposite end by a pin to a lower end of the mirror 125 pivotally mounted at an opposite end by a rod 141. The servomotor 37 serves then to angularly position said mirrors 31 and 125 by one half the angle of the pitch of the aircraft so that the artificial horizon of the strip 21 and the true horizon may appear aligned when viewed by the observer 33.

OPERATION OF THE FOG SIMULATOR OF FIGURE 5

Referring then to the drawing of FIGURE 5, there is shown a schematic diagram of the fog simulator of the instant device adapted to nighttime fog simulation.

In the embodiment of FIGURE 5, it is not desired to create the illumination pattern by use of a source of illumination 23 as was the case in the embodiment used in daytime fog simulation as shown in FIGURE 1. Since the configuration of FIGURE 5 is to be used in nighttime fog simulation, the method of simulating fog will be that of transmitting an illumination pattern, here a view of the true world through a continuous fog pattern strip and combining resultant light rays with an attenuated and diffused view of the true world. The reason for this procedure is that it is the artificial light existing in the true world that must be made to appear as viewed through a fog system. The result, as seen by the observer 33, is a system of artificial lighting existing in the true world with halos surrounding the aforesaid artificial lighting providing a realistic nighttime fog.

Light rays from the true world impinge upon the mirror 125 and are reflected to an input aperture of an image forming lens 127. These rays are now intercepted and angularly rotated by a mirror 128 from which the aforesaid rays are transmitted to the continuous fog pattern strip 21. This fog pattern strip, because it is used in the configuration adapted to nighttime fog simulation, is essentially the reverse of the continuous fog pattern strip 21 described in regard to FIGURE 1. That is, the photographic density gradient of the instant continuous fog pattern strip is as shown in FIGURE 7, where the density is zero at $ah$ equal to zero and is infinite at $\lambda$ equal to zero as compared to the continuous fog pattern strip of FIGURE 1, the embodiment provided for daytime use wherein the loci of constant density is as indicated in FIGURE 3. This continuous fog pattern strip 21 will be positioned in accordance with altitude in a manner similar to that above discussed with reference to FIGURE 1 and further discussed below.

It is known that the equation for light reaching an observer, at night, through a fog, is $I = I_L e^{-ax}$ where $I$ is the intensity of the light reaching the aforesaid observer, $I_L$ is the intensity of a light source, $a$ is the fog density and $x$ is the distance from the observer to the light source.

The intensity of illumination reaching an observer in an aircraft from a light source on the ground cannot, in a situation as here postulated, be programmed onto a fog pattern strip, because the distance to the light source is a function of both the altitude of the aircraft $h$ and the angle of look $\lambda$ of the observer in the aircraft. For this reason the term corresponding to distance, $x$ in the equation $I = I_L e^{-ax}$, has been transposed to $h/\sin \lambda$ where $h$ and $\lambda$ are as above defined. It is thus seen that the term $$e^{-\frac{ah}{\sin \lambda}}$$

represents the term by which a light on the ground is attenuated by a fog.

The continuous fog pattern strip 21 of the embodiment of FIGURE 5 is therefore constructed so as to have a light transmission ratio at any point conforming to this term. The construction of the fog pattern strip 21 of FIGURE 5 may alternatively be explained by noting that the photographic density D at any point on said strip is given by the equation $$D = \log_{10} e^{+\frac{ah}{\sin \lambda}}$$

In the form of FIGURE 5 the light rays provided by the true world, after being attenuated by the continuous fog pattern strip 21, are transmitted to a diffusion screen 27 upon which they are imaged. It is for this reason that the screen 27 is, as previously stated, placed at the focal point of the image forming lens 127. Because the diffusion screen 27 has the attenuated true world scene imaged upon it, the image may be seen by the observer 33 even when the observer is not on a direct line with the screen 27. The image formed on the surface of the diffusion screen 27 is now transmitted to the mirror 130 and angularly oriented so as to be reflected in a direction perpendicular to a collimating lens system 29. The aforementioned rays pass through the collimating lens system 29 and emerge as parallel light rays which are intercepted by combining mirror 31 and transmitted therefrom to the observer 33.

Light rays from the true world are intercepted by attenuator strip 129, said strip having a linear photographic density gradient which is programmed as a function of altitude. The light rays passing through the aforesaid attenuator strip now impinge upon a diffusion screen 131 and result in a halo effect; that is, a diffused circle of light corresponding to each light source on the ground will be transmitted by the diffusion screen 131 to the combining mirror 31 and now the light rays from the continuous fog pattern strip 21 and the light rays from the attenuator strip 129 are combined in the aforesaid combining mirror 31 and transmitted to the observer 33.

An altimeter network 8 of the type described with regard to FIGURE 4, in which an altimeter signal from a network 73, together with a follow up signal from the generator 75 effects a resultant controlling signal for the servomotor 1 which through gearing 3 and suitable linkages positions the follow up signal generator 5 and both the continuous fog pattern strip 21 and the attenuator strip 129, as shown in FIGURE 5, in accordance with the altitude of the aircraft above terrain. This is done so that there may be proper attenuation of the light rays received from outside the aircraft before said light rays are operated upon so as to realistically simulate a selected fog condition.

The continuous fog pattern strip 21 also has an artificial horizon line similar to that of the continuous fog pattern strip 21 utilized in the embodiment shown in FIGURE 1.

Pitch information is transmitted from a pitch information circuit 42 as heretofore described and this information, as transmitted through pitch information output conductors 38 and 40, is transmitted to a servomotor 37 which is connected by suitable mechanical linkages to mirrors 31 and 125. These mirrors 31 and 125 will be angularly oriented to one half the pitch angle of the aircraft so that there may be constant alignment between the true horizon as transmitted through the attenuator strip 129 to the eye of the observer 33 and the simulated horizon which is programmed upon the continuous fog pattern strip 21 in the same manner as was discussed with respect to the artificial horizon of the continuous fog pattern strip 21 utilized in the embodiment of the invention shown in FIGURE 1.

While two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In an aircraft, a display apparatus for simulating visual fog conditions during flight of the aircraft, the display apparatus comprising:
   first optical means including a variable light transmission strip having an effective portion for providing attenuated output light rays in the form of a simulated visual fog pattern;
   motor means mechanically connected to the variable light transmission strip to adjustably position the strip so as to vary the effective portion thereof and thereby the output light rays provided by the first optical means;
   means to control the motor means and thereby the output light rays provided by the first optical means;
   second optical means spatially related to the first optical means to effectively attenuate light rays from a visual scene of a region viewable by an observer in the aircraft during the flight of the aircraft; and
   third optical means spatially related to the first and second optical means and operatively arranged so as to combine the visual fog pattern provided by said variable light transmission strip with the attenuated visual scene effected by the second optical means and transmit a combined view thereof to the observer in the aircraft,
   the means to control the motor means includes altitude responsive means to control the motor means as a function of variations in prevailing altitude of the aircraft carrying the display apparatus during flight so as to cause the motor means to position the strip so as to select the effective portion thereon and thereby vary the attenuated light rays provided by the first optical means in accordance with the prevailing altitude of the aircraft in flight.

2. The display apparatus defined by claim 1 wherein:
   the first optical means includes operator-operative means to adjust the motor control means for altering the output light rays of the first optical means upon a change in ambient light intensity.

3. In an aircraft, a display apparatus for simulating visual fog conditions during flight of the aircraft, the display apparatus comprising:
   first optical means including a variable light transmission strip having an effective portion for providing attenuated output light rays in the form of a simulated visual fog pattern;
   second optical means spatially related to the first optical means to effectively attenuate light rays from a visual scene of a region viewable by an observer in the aircraft during the flight of the aircraft; and
   third optical means spatially related to the first and second optical means and operatively arranged so as to combine the visual fog pattern provided by said variable light transmission strip with the attenuated visual scene effected by the second optical means and transmit a combined view thereof to the observer in the aircraft,
   means responsive to prevailing flight conditions of the aircraft to so select the effective portion of the strip as to vary the simulated visual fog pattern with changes in the prevailing flight conditions of the aircraft,
   the first optical means includes a lens system for intercepting light waves from said visual scene and transmitting said waves through the effective portion of said variable light transmission strip to the third optical means.

4. The display apparatus defined by claim 1 wherein:
   the second optical means includes a variable light transmission strip having an effective portion for providing attenuated output light rays from the visual scene and transmitting said light rays through the effective portion of said variable light transmission strip in the form of a light image to the third optical means; and means mechanically connecting said motor means to the variable light transmission strip of the second optical means to vary the effective portion thereof and thereby the light image transmitted to said third optical means.

5. The display apparatus defined by claim 1 wherein:
the third optical means includes an angularly adjustable partially reflecting mirror means for combining light rays from the first and second optical means, another motor means to angularly position the mirror means, and means responsive to variations in pitch of the aircraft carrying the display apparatus to so control said other motor means as to angularly orient said partially reflecting mirror means so as to cause coincidence between a true horizon of the visual scene and an artificial horizon of the simulated visual fog pattern provided by the first optical means.

6. The display apparatus defined by claim 1 wherein:
the means to control the motor means includes a follow-up signal generator in a feedback loop with the altitude responsive means and motor means to accurately position said strip.

7. The display apparatus defined by claim 1 including:
the first optical means includes a diffusion screen to intercept the light rays from the variable light transmission strip and, a collimating lens system to receive the light rays from the diffusion screen and transmit said light rays in a parallel configuration to the third optical means, and the third optical means includes a partially reflecting mirror to combine the light rays transmitted to the third optical means by the first and second optical means, another motor means to position said partially reflecting mirror and, means responsive to variations in pitch of the aircraft carrying the display apparatus to so control said other motor means as to angularly orient said partially reflecting mirror so as to cause coincidence between a true horizon of the visual scene and an artificial horizon of the simulated visual fog pattern provided by the first optical means.

8. The display apparatus defined by claim 2 including:
a brightness control photocell responsive to the output light rays of the first optical means, and an ambient light photocell responsive to prevailing ambient light intensity impinging thereon, said two photocells providing normally balanced electrical output signals, and an indicator means effective upon an unbalance in said output signals for indicating sense of adjustment of the operator-operative means to alter the output light rays to effect a rebalancing of the electrical output signals effecting by said photocells.

9. In an aircraft, a display apparatus for simulating visual fog conditions during flight of the aircraft, the display apparatus comprising:
first optical means including a variable light transmission strip having an effective portion for providing attenuated output light rays in the form of a simulated visual fog pattern;

second optical means spatially related to the first optical means to effectively attenuate light rays from a visual scene of a region viewable by an observer in the aircraft during the flight of the aircraft; and third optical means spatially related to the first and second optical means and operatively arranged so as to combine the visual fog pattern provided by said variable light transmission strip with the attenuated visual scene effected by the second optical means and transmit a combined view thereof to the observer in the aircraft, the first optical means includes a reflecting mirror, the third optical means includes a partially reflecting mirror, another motor to angularly position said mirrors, and means responsive to variations in pitch of the aircraft carrying the display apparatus to control said other motor means in a sense to so angularly orient said mirrors as to cause coincidence between a true horizon of the visual scene and an artificial horizon of the simulated visual fog pattern provided by the first optical means.

10. The display apparatus defined by claim 1 wherein:
the second optical means includes another variable light transmission attenuator strip having an effective portion positioned between the visual scene and the third optical means, and means to mechanically connect the motor means to the other variable light transmission attenuator strip to vary the effective portion thereof and thereby the attenuation of light rays intercepted from the visual scene.

11. The display apparatus defined by claim 10 wherein:
the second optical means includes a second diffusion scene positioned between said variable light transmission attenuator strip and the third optical means to intercept the light rays transmitted by the attenuator strip to effect halos of light corresponding to light sources viewable in the visual scene.

12. In an aircraft, a display apparatus for visually simulating fog on a visual scene to be viewed by an observer in the aircraft, comprising first means for producing a collimated fog pattern, and second combining means for spatially superimposing the collimated fog pattern on the visual scene as viewed by the observer so as to simulate visual fog conditions during flight of the aircraft,
the first means including a variable light transmission attenuator strip having a selectively effective portion thereof to produce attenuated light rays for effecting the collimated fog pattern, means responsive to prevailing flight conditions of the aircraft to so select the effective portion of said strip as to vary the collimated fog pattern with changes in the prevailing flight conditions of the aircraft, and the second combining means to present for viewing by the observer in the aircraft the collimated fog pattern effected by the attenuated light rays produced by the selected portion of the attenuator strip during the flight of the aircraft.

13. A display apparatus as defined by claim 12 wherein:
the flight condition responsive means includes means responsive to changes in a prevailing altitude of the aircraft in flight to position said strip for selecting the effective portion of the strip so as to vary the collimated fog pattern with changes in the prevailing altitude.

14. A display apparatus as defined by claim 12 including:
means responsive to a prevailing pitch attitude of the aircraft in flight for orienting light rays from the first means to the second means so as to coincide an horizon effected by the attenuator strip with an horizon of the visual scene.

15. A display apparatus as defined by claim 12 wherein:
the flight condition responsive means includes means responsive to changes in a prevailing altitude of the aircraft in flight to position said strip for selecting the effective portion of the strip so as to vary the collimated fog pattern with changes in the prevailing altitude, and the combining means includes means responsive to a prevailing pitch attitude of the aircraft during flight for orienting the fog pattern effected by the attenuator strip so as to coincide an horizon of the simulated fog pattern with an horizon of the visual scene viewable through the combining means.

16. A display apparatus as defined by claim 12 wherein:

the flight condition responsive means includes means responsive to changes in a prevailing altitude of the aircraft in flight to position said strip for selecting the effective portion of the strip so as to vary the collimated fog pattern with changes in the prevailing altitude, the combining means includes means responsive to a prevailing pitch attitude of the aircraft during flight for orienting the fog pattern effected by the attenuator strip so as to coincide an horizon of the simulated fog pattern with an horizon of the visual scene viewable through the combining means, and including another variable light transmission strip to attenuate the visual scene, and a diffusion screen to intercept light rays from the other attenuator strip and transmit halos corresponding to light sources in the visual scene and viewable by the observer through the combining means.

17. A display apparatus as defined by claim 12 wherein:

the flight condition responsive means includes means responsive to a prevailing pitch attitude of the aircraft in flight for orienting light rays from the first means to the second means so as to coincide an horizon effected by the attenuator strip with an horizon of the visual scene, the flight condition responsive means includes means responsive to altitude of the aircraft in flight to position said strip to control the variable light transmission strip so as to vary the attenuation of the fog pattern produced by said strip with the prevailing altitude of the aircraft in flight.

18. A display apparatus as defined in claim 12 in which:

the flight condition responsive means includes means responsive to changes in a prevailing altitude of the aircraft in flight to position said strip for selecting the effective portion of the strip so as to vary the collimated fog pattern with changes in the prevailing altitude, the combining means includes means responsive to a prevailing pitch attitude of the aircraft during flight for orienting the fog pattern effected by the attenuator strip so as to coincide an horizon of the simulated fog pattern with an horizon of the visual scene viewable through the combining means, another variable light transmission strip to attenuate the visual scene, and a diffusion scene to intercept light rays from the other attenuator strip and transmit halos corresponding to light sources in the visual scene and viewable by the observer through the combining means, the means responsive to changes in altitude of the aircraft in flight includes means to simultaneously position both of said strips to control the variable light transmission strips so as to vary the attenuation of the light rays producing the collimated fog pattern and the light rays from the visual scene with prevailing altitude of the aircraft in flight.

19. In an aircraft, a display apparatus as defined by claim 12 including:

means to angularly position the combining means, and means responsive to change in pitch attitude of the aircraft to control the angular positioning means so that the attenuated fog pattern produced by the attenuator strip and combined for viewing in the combining means has an horizon which coincides with an horizon of the visual scene viewable by the observer through the combining means.

20. A display apparatus as defined by claim 12 including:

another variable light transmission strip positioned between the visual scene and the combining means to attenuate the visual scene, and the combining means includes a partially reflecting mirror through which the attenuated visual scene produced by the other variable light transmission strip may be viewed while the attenuated fog pattern produced by the first mentioned variable light transmission strip may be superimposed on the partially reflecting mirror and combined with the visual scene attenuated by the other variable light transmission attenuator for viewing, another mirror angularly positioned between the visual scene and the first mentioned variable light transmission strip to produce the attenuated fog pattern, means to angularly position the partially reflecting mirror and the other mirror, and means responsive to change in pitch attitude of the aircraft to control the angular positioning means so that the attenuated fog pattern combined for viewing in the partially reflecting mirror of the combining means has an horizon which coincides with an horizon of the visual scene viewable by the observer through the partially reflecting mirror.

21. A method for providing in an aircraft an airborne simulation of visual fog conditions during flight of the aircraft, comprising the steps of providing an attenuated visual scene viewable by an observer in the aircraft, providing a longitudinally extending variable light transmission strip having a longitudinal light transmission gradient, illuminating the longitudinally extending variable light transmission strip to effect light rays to simulate a visual fog pattern, sensing variations in flight conditions of the aircraft, longitudinally varying the light transmission strip to alter the simulated fog pattern with the sensed variations of flight conditions of the aircraft to provide a visual illusion to the observer in the aircraft of flight in the aircraft through the simulated visual fog, collimating the simulated fog pattern light rays from said strip, and combining the collimated light rays from the illuminated strip with the attenuated visual scene for viewing by the observer during the flight of the aircraft.

22. The method defined by claim 21 including the steps of sensing variations in altitude of the aircraft in flight, longitudinally varying the light transmission strip with the sensed variations in altitude of the aircraft in flight to provide the visual illusion of flight in the aircraft through the simulated fog during the variations in the altitude of the aircraft.

23. A method for providing in an aircraft an airborne simulation of fog conditions during flight of the aircraft, comprising the steps of providing an attenuated direct view of a visual scene viewable by an observer in the aircraft, providing a longitudinally extending variable light transmission strip having a lateral light transmission gradient, illuminating the longitudinally extending variable light transmission strip to effect light rays to simulate a fog pattern variable with the observer's angle of look to provide a realistic visual fog simulation, collimating the simulated fog pattern light rays from said strip, and combining the collimated light rays from the illuminated strip with the attenuated direct view of the visual scene for viewing by the observer in the aircraft during the flight thereof.

24. The method defined by claim 21 including providing the longitudinally extending variable light transmission strip with both longitudinal and lateral light transmission gradients, and illuminating the longitudinally extending light transmission strip to effect light rays to simulate a fog pattern variable with an observer's angle of look to provide a realistic fog simulation as well as the altering of the simulated fog pattern with variations in the flight conditions of the aircraft.

25. The method defined by claim 23 applied in an aircraft during flight and including the steps of sensing variations in pitch of the aircraft in flight, angularly orienting the light rays from said strip with the sensed variations in pitch of the aircraft so as to cause a horizon of the simulated fog pattern to coincide with a true horizon of the attenuated direct view of the visual scene for viewing upon changes in the sensed pitch attitude of the aircraft.

26. The method defined by claim 24 applied in an aircraft during flight and including the step of angularly orienting the light rays from said strip so as to cause a horizon of the simulated fog pattern to coincide with a true horizon of the attenuated direct view of the visual scene for viewing upon changes in a pitch attitude of the aircraft.

27. The method defined by claim 21 applied in an aircraft during flight and including the step of angularly orienting the light rays from said strip so as to cause a horizon of the simulated fog pattern to coincide with a true horizon of the attenuated direct view of the visual scene for viewing upon changes in a pitch attitude of the aircraft.

28. A method for providing in an aircraft an airborne simulation of visual fog conditions during flight of the aircraft, comprising the steps of providing an attenuated direct view of a visual scene, forming an image of the visual scene and transmitting said image through a longitudinally extending variable light transmission strip having a longitudinal light transmission gradient to effect light rays to simulate a visual fog pattern, longitudinally varying the light transmission strip to alter the simulated fog pattern with variations in flight conditions of the aircraft to provide a visual illusion to an observer in the aircraft of flight in the aircraft through the simulated fog, focusing the transmitted fog pattern image on a diffusion screen, collimating the simulated fog pattern image from said diffusion screen, and combining fog pattern image light rays from the diffusion screen with the attenuated direct view of the visual scene for viewing by the observer during the flight of the aircraft.

29. A method for providing in an aircraft an airborne simulation of visual fog conditions during flight of the aircraft, comprising the steps of forming an image of a visual scene and transmitting said image through a longitudinally extending variable light transmission strip having a longitudinal light transmission gradient to effect light rays to simulate a visual fog pattern, sensing variations in flight conditions of the aircraft, longitudinally varying the light transmission strip to alter the simulated fog pattern with the variations in the sensed flight conditions of the aircraft to provide a visual illusion to an observer in the aircraft of flight in the aircraft through the simulated fog, focusing the transmitted fog pattern image on a diffusion screen, and presenting fog pattern image light rays from the diffusion screen for viewing by the observer during the flight of the aircraft.

30. A method of attenuating a visual scene viewable by an observer from an aircraft during flight of the aircraft comprising the steps of attenuating the visual scene through a longitudinally extending variable light transmission strip having a longitudinal light transmission gradient, sensing variations in flight conditions of the aircraft, longitudinally varying the light transmission strip to alter the attenuation of the visual scene in accordance with the variations in the flight conditions of the aircraft, and presenting the attenuated view for viewing by the observer during the flight of the aircraft.

31. The method defined by claim 30 including the step of transmitting the attenuated view through a diffusion screen to provide a halo of light corresponding to a light source existing in the visual scene.

32. The method defined by claim 21 including in the illumination of the strip an additional step of forming an image of the visual scene and transmitting light rays from said image through the longitudinally extending variable light transmission strip in illuminating the strip to effect light rays to simulate the fog pattern.

33. The method defined by claim 32 including the additional step of focusing the fog pattern image transmitted through the strip on a diffusion screen, and thereafter effecting the collimating of the simulated fog pattern light rays.

34. A method for providing in an aircraft during flight an airborne simulation of fog conditions, comprising the steps of providing an attenuated visual scene viewable by an observer in the aircraft, forming an image of the visual scene, providing a longitudinally extending variable light transmission strip having a longitudinal light transmission gradient and a lateral light transmission gradient, transmitting light rays from said image of the visual scene through said strip to effect light rays to simulate a fog pattern variable with the observer's angle of look, sensing change in altitude of the aircraft during the flight, longitudinally varying the strip with the sensed change in the altitude of the aircraft to alter the simulated fog pattern with prevailing flight conditions of the aircraft to provide a realistic visual fog simulation, focusing the transmitted light rays effected by the image on a diffusion screen to provide a simulated fog pattern image, collimating the light rays effected by the simulated fog pattern image from said diffusion screen, sensing change in pitch attitude of the aircraft during flight, angularly orienting the image of the visual scene transmitted to said strip and the collimated fog pattern image with the sensed change in the pitch attitude of the aircraft in flight so as to cause a horizon of said collimated fog pattern image to coincide with a horizon of the attenuated visual scene, and combining the collimated fog pattern image light rays from the diffusion screen with the attenuated visual scene for viewing by the observer during flight of the aircraft.

References Cited

UNITED STATES PATENTS 2,061,378   11/1936   Henze et al. _____ 88—24
2,336,508   12/1943   Smith et al. _____ 88—24

OTHER REFERENCES

IBM Tech. Disc. Bulletin, vol. 8 No. 1, June 1965, Diegert, pp. 128–130.

EUGENE R. CAPOZIO, *Primary Examiner.*

PAUL V. WILLIAMS, *Assistant Examiner.*

U.S. Cl. X.R.

88—1; 350—174